Patented Feb. 14, 1950

2,497,432

UNITED STATES PATENT OFFICE 2,497,432

ANTIRUSTING COMPOSITION

Edward S. Blake, Nitro, W. Va., assignor to Monsanto Chemical Company, St. Louis, Mo., a corporation of Delaware No Drawing. Application April 3, 1947,
Serial No. 739,247

8 Claims. (Cl. 252—56)

This invention has to do with lubricants and is particularly concerned with lubricants for ferrous metal surfaces in an environment where such surfaces are also subject to contact with water and in consequence are likely to rust.

The invention is particularly applicable to turbine oils which in service are more or less contaminated with water and therefore, must resist rusting as well as emulsification. Difficulties have been experienced during the operation of steam turbines because of rusting of the metal parts and it has been proposed to add various agents to overcome this difficulty. This invention provides a superior class of rust inhibiting agents.

According to the present invention, mineral oil fractions of lubricating viscosity containing a minor proportion of an oil soluble alkyl ester of a glycol bis aliphatic polycarboxylic acid ester have been found to possess anti-rusting properties. The proportion used may vary widely but for turbine lubrication proportions within the range of 0.02% to 0.25% will in general be satisfactory. These materials impart high resistance to rusting and at the same time do not interfere with the non-emulsifying characteristics required.

The anti-rusting agents of this invention are polyesters derived from polycarboxylic acids, polyhydric alcohols, and monohydric alcohols. Because of the complex nature of their chemical composition, it is not possible to state their chemical structure with absolute certainty. The products may be mixtures of related materials. Therefore, the invention also relates to oils containing polyester materials produced by the methods herein described.

Oil soluble alkyl esters of a glycol bis alkylene dicarboxylic acid are conveniently prepared by reacting an anhydride of a dicarboxylic acid either with a glycol and then with a monohydric alcohol or with a monohydric alcohol and then with a glycol, leaving at least one hydroxyl group of the latter free, and finally condensing with a further quantity of anhydride. For example, succinic anhydride, a typical representative of a suitable anhydride, reacts vigorously with monoethylene glycol. It is believed that the reaction proceeds mainly in accordance with the following equation:

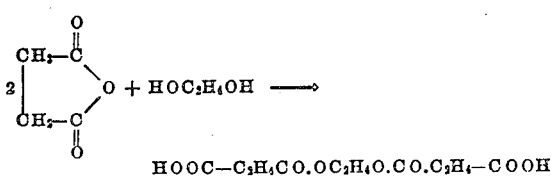

The dicarboxylic acid ester so produced is then treated with a monohydric alcohol to esterify one or both of the carboxyl groups.

Alternatively, the anhydride may first be condensed with a monohydric alcohol. Thus, again employing succinic anhydride as illustrative of a polycarboxylic anhydride and employing oleyl alcohol as illustrative of a monohydric alcohol, the reaction is represented by the following equation:

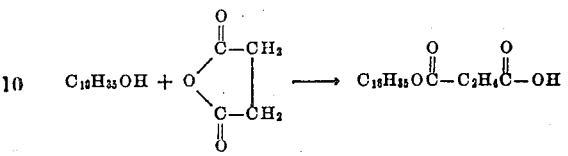

The monocarboxylic acid ester is then reacted with a glycol so as to leave at least one hydroxyl group of the latter free

The monohydric ester alcohol is then reacted with a further quantity of anhydride to obtain the final product in accordance with the equation:

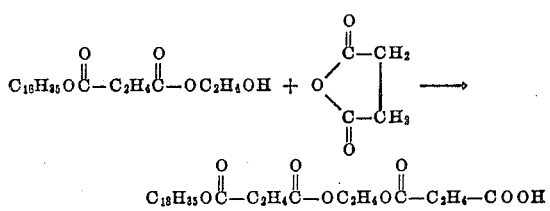

Polycarboxylic acids instead of the anhydrides may be used for the preparation of anti-rust agents of this invention, but the reaction with anhydrides provides a convenient method of controlling the reaction so as to esterify only one carboxyl group at a time, thereby permitting a second carboxyl group to be esterified with a different alcohol as required for the preparation of the new products.

A wide variety of alcohols may be employed for the preparation of the new agents. The most effective anti-rusting agents have been obtained by use of unsaturated alcohols such as oleyl or $\Delta^{9:10}$ octadecenyl alcohol. Other suitable unsaturated alcohols comprise linoleyl or $\Delta^{9:10}$, $\Delta^{12:13}$ octadecadienyl alcohol, linolenyl or $\Delta^{9:10}$, $\Delta^{12:13}$, $\Delta^{15:16}$ octadecatrienyl alcohol, clupanodonyl alcohol, a 22 carbon nonconjugated alcohol containing 6 double bonds derived from menhaden oil, and erucyl or $\Delta^{13:14}$ docosenyl alcohol. This is a class of alcohols available from the reduction of fatty acid esters, as for example olive oil, linseed oil, tung oil, rapeseed oil, and marine oils.

The examples below illustrate the preparation of the new rust inhibiting agents and are not to be taken as limitative of the invention.

Mono oleyl succinate

Into a container of suitable capacity there was charged 100 parts by weight of succinic anhydride and 268 parts by weight of oleyl alcohol (substantially one molecular proportion of each). A quantity of benzene was added sufficient to provide a refluxing temperature slightly above 100° C. The mixture was then heated at 100–103° for ten hours and the solvent removed by distillation under reduced pressure. More particularly, the mixture was heated up to 130° C./1–2 mm. to remove the benzene. The residue was then filtered and on cooling solidified to a waxy solid of neutralization number 151. The calculated neutralization number is 152.

Oleyl beta hydroxy ethyl succinate

Mono oleyl succinate, 161.9 parts by weight or 0.44 molecular proportion, and ethylene glycol, 124 parts by weight or 2.0 molecular proportions were mixed with toluene sufficient to impart a refluxing temperature of 140–150° C. The mixture was heated at refluxing temperature for seven hours, and then an additional 100 parts by weight of ethylene glycol and more toluene were added to impart a refluxing temperature of 170–180° C., and the mixture heated for nine hours at 170–180° C. During the reaction water and glycol were removed from the reaction zone and finally all the excess glycol was removed by vacuum stripping up to 160°/1 mm. The residue was diluted with a solvent, as for example acetone, and filtered through a bed of clay after which the solvent was removed by vacuum stripping. The product had a neturalization number of zero indicating that complete esterification had been effected. It was a liquid at ordinary temperatures but solidified on refrigeration. The hydroxyl groups available for further esterification were somewhat more than the calculated value, probably due to the presence of free alcohol constituents not removed by the vacuum stripping. Thus, the Zerewitinoff method for determination of hydroxyl groups by methane evolution gave 27.3 cc. of methane as compared to a calculated value of 22.5 cc.

Example I

Into a container of suitable capacity provided with a reflux condenser there was charged substantially 69.4 parts by weight of the above oleyl beta hydroxy ethyl succinate and 20 parts by weight of succinic anhydride together with benzene in amount sufficient to impart a refluxing temperature of slightly above 100° C. The mixture was heated at about 105° C. for ten hours, then diluted with a mixture of petroleum ether and benzene and filtered through a bed of clay. The solvent was removed by distillation under reduced pressure. The product obtained as a residue was a yellow brown liquid readily soluble in mineral oil fractions and was believed to comprise mainly the mono oleyl ester of ethylene di-acid succinate.

Mono oleyl maleate

Into a container of suitable capacity there was charged 303.5 parts by weight (substantially 1.02 molecular proportions) of 90% oleyl alcohol and .98 parts by weight (substantially 1.00 molecular proportion) of maleic anhydride. The reactants were stirred and heated at 45–60° C. for nineteen hours. Temperatures of 100° C. and above are to be avoided as there is then considerable water split out, probably as the result of the formation of the neutral ester. The reaction mixture was cooled, diluted with petroleum ether, and filtered from a small amount of unreacted maleic anhydride admixed with a proportion of the desired mono ester.

The solvent was removed from the filtrate by vacuum distillation at 50–60°/7 mm. The residue was a clear yellow oil, neutralization number 124, saponification number 269. Determination of the hydroxyl substituents by Zerewitinoff method of methane evolution gave 59.2 cc. per gram. Assuming that the 2% excess oleyl alcohol employed in the initial charge remains in the final product and that the 10% of impurities present in the initial alcohol are present as inert ingredients, as they appear to be, the composition of the final crude product would be 87.9% of the desired mono ester, 10.4% inert ingredients, and 1.7% oleyl alcohol. Such a composition would have a neutralization number of 134, a saponification number of 270 and would evolve 55.2 cc. of methane per gram in the Zerewitinoff hydroxyl determination. The crude mono oleyl maleate so obtained was then reacted with ethylene glycol as described below.

The maleic anhydride can be readily removed from the other solids which precipitate from the reaction mixture by dissolving the combined solids in acetone and then pouring the acetone solution into a large excess of water. The maleic acid is removed from the water and the water insoluble solids filtered off and combined with the main proportion if desired. The mono oleyl maleate obtained from the water had a neutralization number of 157 as compared to the calculated value of 153.

Oleyl beta hydroxy ethyl maleate

Into a reaction vessel of suitable capacity fitted with a water trap and reflux condenser there was charged substantially 250 parts by weight of mono oleyl maleate, 425 parts by weight of ethylene glycol and benzene sufficient to provide a mixture which refluxed at 140–150° C. The mixture was then heated at reflux for 35 hours while water and glycol were stripped out. The excess glycol and solvent were then removed by vacuum distillation up to 169°/4 mm. The residue was diluted with a solvent, as for example petroleum ether, and filtered through a layer of clay, washed thoroughly and the solvent removed by vacuum distillation. The residue was a yellow brown oil comprising oleyl beta hydroxy ethyl maleate which by the Zerewitinoff hydroxyl determination gave 65.2 cc. methane per gram. It was reacted with maleic anhydride as described below employing that amount of the anhydride required to react with the hydroxyl groups actually present as determined by the aforementioned analysis.

Example II

Oleyl beta hydroxy ethyl maleate, 189.3 parts by weight, and maleic anhydride, 52.4 parts by weight, were admixed in a suitable reaction vessel and stirred and heated at 50–60° C. for twenty-four hours. The product was a clear yellow brown oil readily soluble in mineral oil fractions which was believed to comprise mainly the mono oleyl ester of ethylene di-acid maleate.

Example III

Into a reaction vessel of suitable capacity fitted with a water trap and reflux condenser there was charged 31 parts by weight of ethylene glycol (substantially 0.5 molecular proportion) and 100 parts by weight of succinic anhydride (substantially 1.0 molecular proportion). The mixture was warmed slightly whereupon a vigorous reaction set in. Cooling was applied to keep the temperature below 170° C. and then after the vigor of the reaction had subsided, stirring and heating was continued for two hours at 150° C. 268 parts by weight (substantially 1.0 molecular proportion) of oleyl alcohol was added together with a quantity of benzene sufficient to impart a temperature of reflux within the range of 128–148° C. The mixture was heated at 128–148° C. for seventeen and one-half hours during which time the water formed as a by-product of the esterification was removed from the reaction zone. The solvent was removed by distillation under reduced pressure and the residue treated with 6 parts by weight of calcium carbonate and 10 parts by weight of Attapulgus clay and filtered. The clear oil was again dissolved in a solvent such as petroleum ether and again clay treated after which the solvent was topped out by heating up to 120° C./4–5 mm. The product so obtained was an oily liquid readily soluble in mineral oil fractions and was believed to comprise mainly the di oleyl ester of ethylene di-acid succinate.

The oil used in the compositions may be of the types normally used for the lubrication of steam turbines. In general the oil may be defined as a viscous mineral oil fraction having a Saybolt Universal viscosity of from 100 to 600 seconds at 100° F. Usually, well refined, highly paraffinic materials are employed. Typical turbines oils with which the poly esters of this invention may be admixed to provide improved turbine oils have the following specifications:

*Table I*

|  | Oil A | Oil B |
| --- | --- | --- |
| Gravity, °A. P. I. | 28.4 | 24.8 |
| Pour test, °F. | 5 | 10 |
| Flash, °F. | 385 | 390 |
| Color, A. S. T. M. | 1 | 1.5 |
| Viscosity, Saybolt at: |  |  |
| 100° F. | 148/155 | 315/325 |
| 130° F. | 84.5 | 145 |
| 210° F. | 43 | 50 |

The test employed to demonstrate the effectiveness of the oil blends in preventing rusting involved the immersion of strips of cold rolled steel in a beaker of oil containing 10% of a synthetic sea water. The composition of the latter was as follows:

|  | Gms./liter |
| --- | --- |
| MgCl₂.6H₂O | 11.0 |
| CaCl₂ | 1.2 |
| Na₂SO₄ | 4.0 |
| NaCl | 25.0 |

The mixture of oil and water was vigorously stirred for forty-eight hours at a temperature of 140° F. After the test had been run, the strips were examined and rated on the amount of rusting visually observable. In rating the specimens the complete absence of rust is indicated by the word "none."

| Composition | Degree of Rusting |
| --- | --- |
| Oil alone | severe. |
| Oil+0.02% oleyl ester of ethylene di-acid succinate | moderate. |
| Oil+0.04% oleyl ester of ethylene di-acid succinate | none. |
| Oil+0.08% oleyl ester of ethylene di-acid succinate | Do. |
| Oil+0.25% dioleyl ester of ethylene di-acid succinate | Do. |
| Oil+0.07% oleyl ester of ethylene di-acid maleate | Do. |

From the foregoing it is evident that a minor proportion of the ester provides a lubricant which may be effectively used in the presence of moisture to prevent rusting of ferrous metal parts by the moisture present.

In addition, the emulsifying characteristics of the above oil compositions containing the ester additive were determined by the Federal Standard Emulsion Test for Lubricating Oils (Federal Specification VVL-791b, Method 320.13, February 19, 1942). The test comprises agitating equal volumes of oil and water at 130° F. to obtain thorough mixing, followed by settling at 130° F. and reading the time required for the emulsion to break or the volume of emulsion remaining after settling 30 minutes, 3 cc. or less being considered satisfactory. The test was conducted with distilled water and also with 1% NaCl solution. It was found that the oil and water layers separated substantially completely in considerably less than 30 minutes.

Other agents may be added to the compositions where desired in addition to the anti-rusting agents. Antioxidants and corrosion inhibitors, many of which are well known to the art, as for example beta naphthol and aniline disulfide, may be employed and other agents commonly employed in the compounding of mineral oil lubricants.

Although the invention has been described and illustrated with respect to certain preferred mineral oil blends, the invention is not restricted to the specific examples. The invention is limited only by the claims attached hereto as part of the present specification.

What is claimed is:

1. An anti-rusting composition consisting essentially of a mineral oil fraction of lubricating viscosity containing 0.02% to 0.25% of oil soluble olefinic alcohol esters of mono-ethylene glycol bis alkylene dicarboxylic acid ester said olefinic alcohol containing 18–22 carbon atoms and said dicarboxylic acid containing 4 carbon atoms.

2. An anti-rusting emulsion resistant turbine oil consisting essentially of a well refined mineral oil fraction containing about 0.02% to 0.25% of an oil soluble olefinic alcohol ester of mono-ethylene glycol bis alkylene dicarboxylic acid ester said olefinic alcohol containing 18–22 carbon atoms and said dicarboxylic acid containing 4 carbon atoms.

3. An anti-rusting composition consisting essentially of a refined mineral oil fraction containing a minor proportion sufficient to impart anti-rusting properties of an oil soluble olefinic alcohol ester of mono-ethylene glycol bis alkylene dicarboxylic acid ester said olefinic alcohol containing 18–22 carbon atoms and said dicarboxylic acid containing 4 carbon atoms.

4. A refined mineral oil containing an anti-rusting agent in amount sufficient to impart anti-rusting properties, said agent having the structural formula:

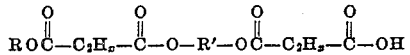

where R is an unsaturated alkyl chain of at least 18 carbon atoms, $x$ is an even number less than 5 and R' is a divalent aliphatic chain containing two carbon atoms.

5. A refined mineral oil containing an anti-rusting agent in amount sufficient to impart anti-rusting properties, said agent having the structural formula:

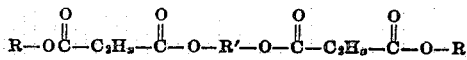

where R is an unsaturated alkyl chain of at least 18 carbon atoms, $x$ is an even number less than 5 and R' is a divalent aliphatic chain containing two carbon atoms.

6. A refined mineral oil containing an anti-rusting agent in amount sufficient to impart anti-rusting properties, said agent having the structural formula

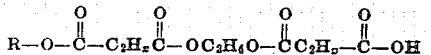

where $x$ is an even number less than 5 and where R is an octadecenyl group.

7. An anti-rusting, emulsion resistant turbine oil consisting essentially of a well refined mineral oil fraction containing about 0.02% to 0.25% of mono-oleyl alcohol ester of an ethylene glycol di-acid succinate.

8. An anti-rusting, emulsion resistant turbine oil comprising a well refined mineral oil fraction containing about 0.02% to 0.25% of an oleyl alcohol ester of mono-ethylene glycol di-acid maleate.

EDWARD S. BLAKE.

REFERENCES CITED

The following references are of record in the file of this patent:

UNITED STATES PATENTS

| Number | Name | Date |
|---|---|---|
| 2,075,107 | Frazier | Mar. 30, 1937 |
| 2,234,722 | Dickey | Mar. 11, 1941 |
| 2,295,165 | De Groote | Sept. 8, 1942 |
| 2,375,516 | Blair | May 8, 1945 |
| 2,384,595 | Blair | Sept. 11, 1945 |
| 2,415,366 | Muskat | Feb. 4, 1947 |
| 2,422,881 | Blair | June 24, 1947 |

Certificate of Correction

Patent No. 2,497,432 February 14, 1950

EDWARD S. BLAKE

It is hereby certified that errors appear in the printed specification of the above numbered patent requiring correction as follows:

Column 7, line 22, strike out the words "of mono-oleyl alcohol ester of an ethylene" and insert instead *an oleyl alcohol ester of mono-ethylene;* and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*